(12) United States Patent
Okada et al.

(10) Patent No.: US 7,073,915 B2
(45) Date of Patent: Jul. 11, 2006

(54) MIRROR FIXING METHOD AND OPTICAL APPARATUS

(75) Inventors: Hideo Okada, Kawasaki (JP); Yuji Sakata, Kawasaki (JP); Shinichi Wakana, Kawasaki (JP); Yujin Yamazaki, Kawasaki (JP); Yuichi Kawahata, Kawasaki (JP); Nobuaki Mitamura, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/662,484

(22) Filed: Sep. 16, 2003

(65) Prior Publication Data

US 2004/0057127 A1    Mar. 25, 2004

(30) Foreign Application Priority Data

Sep. 20, 2002   (JP)   .............................. 2002-275470

(51) Int. Cl.
G02B 5/08     (2006.01)
G02B 7/192    (2006.01)

(52) U.S. Cl. ..................................... 359/848; 359/871

(58) Field of Classification Search ................ 359/896, 359/872, 868, 869, 848; 248/476, 479, 480
See application file for complete search history.

(56) References Cited

U.S. PATENT DOCUMENTS

| 3,488,123 | A |   | 1/1970  | Nichols  |            |
|-----------|---|---|---------|----------|------------|
| 4,618,223 | A |   | 10/1986 | Fried    |            |
| 4,637,695 | A |   | 1/1987  | Perkins  |            |
| 4,705,369 | A | * | 11/1987 | Humpal   | ........................ 248/476 |
| 4,991,815 | A |   | 2/1991  | Softness |            |
| 5,838,849 | A |   | 11/1998 | Shirasaki |           |
| 5,867,512 | A | * | 2/1999  | Sacher   | ........................ 372/20 |
| 5,930,045 | A |   | 7/1999  | Shirasaki |           |
| 5,949,593 | A |   | 9/1999  | Lloyd    |            |
| 5,969,865 | A |   | 10/1999 | Shirasaki |           |
| 5,969,866 | A |   | 10/1999 | Shirasaki |           |
| 5,973,838 | A |   | 10/1999 | Shirasaki |           |
| 5,982,488 | A |   | 11/1999 | Shirasaki |           |
| 5,999,320 | A |   | 12/1999 | Shirasaki |           |

FOREIGN PATENT DOCUMENTS

| GB | 1 133 433 A | 11/1968 |
| GB | 1 513 240 A | 6/1978  |
| JP | 10-170847   | 6/1998  |
| JP | 11-064764   | 3/1999  |
| JP | 11-077353   | 3/1999  |

OTHER PUBLICATIONS

United Kingdom Search Report dated Mar. 10, 2004 for corresponding application GB 0322007.6.

* cited by examiner

Primary Examiner—Mark A. Robinson
(74) Attorney, Agent, or Firm—Staas & Halsey LLP

(57) ABSTRACT

An object of the invention is to provide a mirror fixing method capable of reducing stress distortion of a surface of a mirror which constitutes an optical system, with hardly deforming a surface shape of the mirror. To this end, the present mirror fixing method is characterized in that a mirror part including a base plate formed with a mirror on one face thereof, is provided with a boss on the other face of the base plate opposite to the face on which the mirror is formed, and only the boss is fixed, so that the mirror part excluding the boss is not in contact with other members.

17 Claims, 7 Drawing Sheets

US 7,073,915 B2

MIRROR FIXING METHOD AND OPTICAL APPARATUS

BACKGROUND OF THE INVENTION (1) Field of the Invention

The present invention relates to a mounting technique for fixing mirrors that are used for constructing an optical system. In particular, the invention relates to a mirror fixing method for preventing stress distortion of mirror surface due to the fixing, and to an optical apparatus using the method.

(2) Related Art

Normally, in order to construct an optical system, members such as a light source, lenses and mirrors are used to change an optical path or to collect lights. For example, as shown in FIG. 8, a mirror part 100 is sometimes used for changing a propagation direction of light emitted from a light source by 90°. In this mirror part 100, typically a mirror 101 with a mirror surface formed by vapor deposition of metal or the like on the surface of a base material made of glass, plastic, or the like, is fixed on a jig 102 for use. As a conventional method of fixing the mirror 101 on the jig 102, there is known a method in which an adhesive is applied on the back of the mirror 101, which is then adhered at a desired position of the jig 102. Moreover, for example, as shown in FIG. 10, there is also applied a method where the mirror 101 is inserted into the jig 102 with a threaded type fixing ring 103.

The mirror 101 fixed to the jig 102 as described above, is used as a part of an optical system such as a variable wavelength dispersion compensator (to be referred to as a VIPA-VDC) which uses a VIPA (abbreviation of Virtually Imaged Phased Array, a device that branches for each wavelength, an optical signal that is a combination of more than one wavelength) as disclosed in Japanese National Publication Nos. 2000-511655 and 2002-514323 of PCT Applications previously filed by the present applicant. FIG. 11 is a perspective view showing an outline of the abovementioned VIPA-VDC. This VIPA-VDC has a configuration where, for example, a mirror assembly 110 in which an aspherical mirror 112 fixed to an L-shaped jig 111 is installed on a movable stage 113, is combined with a VIPA assembly 120 in which an optical fiber 121, collimator lenses 122 and 123, a VIPA 124, and a collimator lens 125 are arranged in that order. In this VIPA-VDC, light emitted from the optical fiber 121 is input to the VIPA 124 via the collimator lenses 122 and 123. In the VIPA 124, the incident light is subjected to multiple reflections, and is branched for each of different wavelengths to be emitted. The emitted light is sent to the mirror assembly 110 via the collimator lens 125. The light branched for each wavelength in the VIPA assembly 120, is reflected by the aspherical mirror 112 in the mirror assembly 110, to be again input to the VIPA assembly 120, and is propagated through the VIPA assembly 120 in a direction opposite to the above propagation direction is collected by the optical fiber 121. The VIPA-VDC of such a construction has the feature in that a compensation amount for wavelength dispersion can be changed by moving the aspherical mirror 112 according to a dispersion amount. The reflecting surface of the aspherical mirror 112 is prepared with high accuracy so that a desired compensation amount can be obtained.

However, if the mirror 101 is fixed to the jig 102 by adhesive or mechanical fixing as with the above described conventional technique, there is a problem of stress distortion developing on the mirror surface due to the fixing.

More specifically, when for example, as shown in FIG. 12, the mirror 101 is fixed to the jig 102 with adhesive 104, then considering the case of a change in temperature, the shape of the mirror surface is deformed to become concave or convex as shown at the right of FIG. 12, since the material used for the jig 102 has the coefficient of thermal expansion different from that of the mirror 101 (plastic for instance). Moreover, the surface shape of the mirror 101 is sometimes deformed due to shrinkage stress of the adhesive, other than the temperature change. If such distortion develops on the surface of the mirror 101, the surface of the mirror 101 has a curved surface shape different from the designed value and hence a desired compensation amount cannot be obtained in devices such as the aforementioned VIPA-VDC illustrated in FIG. 11. As another drawback of the fixing method using an adhesive, there is a possibility that the mirror 101 comes away from the jig 102 when the adhesive is deteriorated. Especially, for the various types of devices used in optical communication systems, such as the VIPA-VDC, long-term reliability with a product life of 25 years or so is required. Therefore, there is a need to realize a stable fixing method without the use of an adhesive.

In the case where a mechanical fixing method is applied, then for example as shown in FIG. 13, a pressing force acts on a part "b" where the mirror 101 and a member 102B that forces the mirror 101 to a member 102A being a part of the jig, are in contact with each other. However, for a part "a" where there is not contact, since a pressing force does not act (refer to the cross-section A—A in the lower part of FIG. 13), then if the temperature rises, the part "a" of the mirror 101 expands, whereas the part "b" does not expand so much. Consequently, the surface of the mirror 101 is distorted in a convex shape.

SUMMARY OF THE INVENTION

The present invention addresses the above problems, with an object of providing a mirror fixing method capable of reducing stress distortion of a surface of a mirror which constitutes an optical system, by practically avoiding deformation in the shape of the mirror surface, and an optical apparatus using the method.

To achieve the aforesaid object, a mirror fixing method of the present invention, is characterized in that a mirror part including a base plate formed with a mirror which constitutes an optical system on one face thereof, is provided with a boss on the other face of the base plate opposite to the face on which the mirror is formed, and only the boss is fixed, so that the mirror part excluding the boss is not in contact with other members.

Moreover, an optical apparatus of the present invention having an optical system constructed using a mirror, comprises: a mirror part including a base plate formed with the mirror on one face thereof, and a boss provided on the other face of the base plate opposite to the face on which the mirror is formed; and a first fixture fixing only the boss, so that the mirror part excluding the boss is not in contact with other members.

According to the abovementioned mirror fixing method and optical apparatus, the stress at the time of fixing has little effect on the mirror. Moreover, since restriction by other members, of thermal expansion due to a temperature change or the like of the base plate on which the mirror is formed is also avoided, it becomes possible to reduce stress distortion of a mirror surface, developing due to the fixing.

Moreover, as a specific aspect of the abovementioned optical apparatus, it is preferable that the first fixture includes a receiving plate which is formed with an opening capable of inserting the boss therein and provided with a screw hole perpendicular to a side wall of the opening, and the boss which is inserted in the opening of the receiving plate is fixed with a screw from the side using the screw hole. As a result, the mirror part is screw fixed to the receiving plate by the first fixture, and the stress at the time of fixing acts only from the side of the boss.

In addition, in the above-mentioned optical apparatus, the construction may be such that a movable stage and a second fixture mountable on the movable stage are provided, and the second fixture and the first fixture are coupled with each other to constitute a mirror module, and the mirror module is installed on the movable stage via the second fixture. As a result, the mirror module comprising the mirror part, the first fixture and the second fixture, is installed on the movable stage, so that the mirror constituting an optical system is fixed in a movable manner.

Furthermore, for the mirror part in the above-mentioned optical apparatus, an aspherical surface mirror used in a variable wavelength dispersion compensator may be formed on the one face of the base plate. As a result, a possibility that the surface shape of the aspherical mirror constituting the optical system of the variable wavelength dispersion compensator is deformed due to the stress at the time of fixing is considerably reduced. Therefore, wavelength dispersion compensation can be performed stably with high accuracy.

Other objects, features and advantages of this invention will become apparent from the following description of embodiments in conjunction with the appended drawings.

DETAILED DESCRIPTION OF THE INVENTION

Hereunder is a description of embodiments of the present invention based on the drawings.

Figure 1:
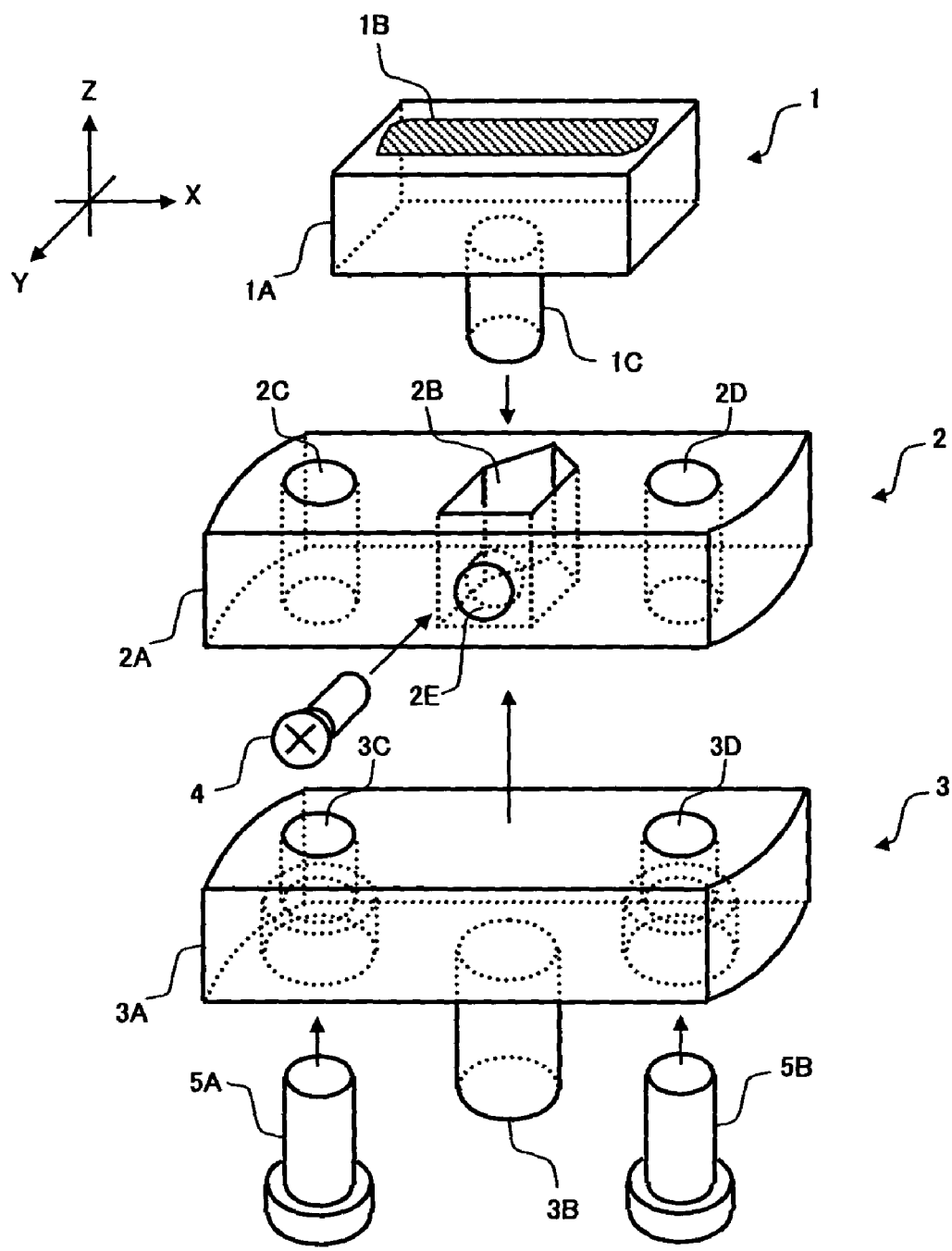
FIG. 1 is an exploded perspective view showing components in one embodiment of an optical apparatus of the present invention.
Figure 2:
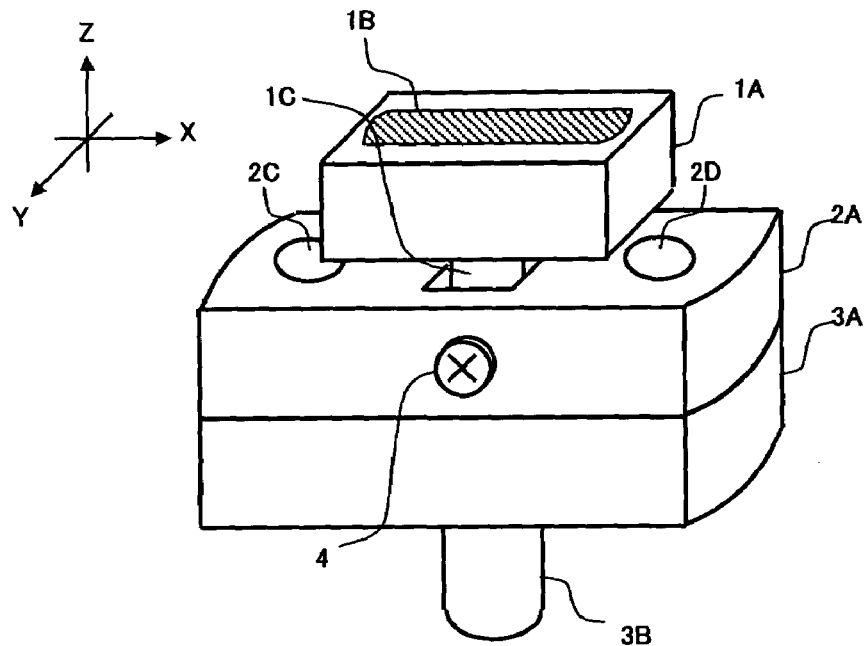
FIG. 2 is a perspective view showing the appearance with the components of FIG. 1 assembled.

FIG. 1 is a perspective view of one embodiment of an optical apparatus to which a mirror fixing method of the present invention is applied, showing respective components in exploded form. FIG. 2 is a perspective view showing the appearance with the components of FIG. 1 assembled.

As shown in FIG. 1 and FIG. 2, the present optical apparatus comprises, for example, a mirror part 1, a first fixture 2 and a second fixture 3.

The mirror part 1 includes, for example, a base plate 1A formed using a material such as glass, plastics or the like, a mirror 1B formed by vacuum deposition of a metal or the like on one face (upper face in the figure) of the base plate 1A, and a protruding type boss 1C formed on the other face (lower face in FIG. 1) of the base plate 1A opposite the face on which the mirror 1B is formed. The mirror 1B is made with high accuracy so that its surface achieves a desired shape (for example, a plane surface, a spherical surface or an aspherical surface etc.). The boss 1C here is a cylindrical shape protrusion formed integrally with the base plate 1A. However, the boss 1C is not limited to have the cylindrical shape alone, and as described later, this can be of any arbitrary shape capable to be fixed by the first fixture 2. Furthermore, the base plate 1A and boss 1C need not be formed integrally, and may be formed by securing together separate members.

The first fixture 2 includes a receiving plate 2A fixing the mirror part 1 at a predetermined position, and this receiving plate 2A is formed with a boss receiving V-groove part 2B serving as an opening and screw holes 2C, 2D and 2E. The boss receiving V-groove part 2B comprises a hole formed in an approximately central part of the receiving plate 2A to pass from the upper face to the lower face of the receiving plate 2A. The boss 1C of the mirror part 1 is inserted in this hole to be held therein. Furthermore, for the boss receiving V-groove part 2B, here a part of the side wall of the hole is made a V-groove structure to increase the accuracy of positioning the mirror part 1. However, the hole (opening) that receives the boss 1C is not limited to the aforementioned V-groove structure, and can be a cylindrical shape or the like corresponding to the shape of the boss 1C. The screw holes 2C and 2D are formed in opposite lengthwise edge portions of the receiving plate 2A. These are sites for fixing the second fixture 3 to the lower face of the receiving plate 2A by means of receiving plate fixing screws 5A and 5B. The screw hole 2E is formed in a perpendicular direction to the side wall of the receiving plate 2A opposite the V-groove of the boss receiving V-groove part 2B, and as described later, is a site to which is attached a boss fixing screw 4 for fixing the boss 1C at a predetermined position of the V-groove.

The second fixture 3 includes a receiving plate 3A for further mounting the first fixture 2 with the mirror part 1 secured thereto, on for example a movable stage or the like. An angle adjusting boss 3B as well as countersunk holes 3C and 3D are respectively formed on the receiving plate 3A. The angle adjusting boss 3B, is a cylindrical shape protrusion formed on the surface (lower face in the figure) of the receiving plate 3A opposite the face contacting the first fixture 2. As described later, the angle adjusting boss 3B mounts the mirror part 1 on a movable stage or the like such that an angle of the mirror part 1 can be adjusted. The countersunk holes 3C and 3D are formed in opposite lengthwise edge portions of the receiving plate 3A, and are sites in which are inserted the receiving plate fixing screws 5A and 5B to be screwed in the screw holes 2C and 2D in the first fixture.

Figure 3:
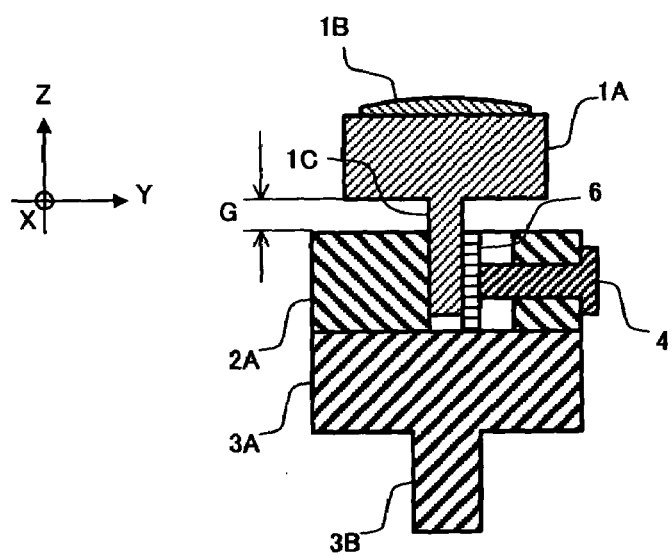
FIG. 3 is a sectional view for explaining a method of fixing a mirror part to a first fixture in the embodiment.

Here, the method of fixing the mirror part 1 to the first fixture 2, which is a main characteristic of the mirror fixing method according to the present invention, will be described in detail with reference to a sectional view of FIG. 3. Note, the sectional view of FIG. 3 shows a cross-section of the optical apparatus shown in FIG. 2, when cut along the Y-Z plane through the center of the boss 1C. However, here three-dimensional coordinates X-Y-Z shown in the upper left of FIG. 2, that is, a coordinate system with the upper face of the base plate 1A on which the mirror 1B is formed, as the X-Y plane, and a direction orthogonal to the X-Y plane as the Z axis, is set.

As shown in FIG. 3, the boss 1C is inserted in the boss receiving V-groove 2B of the first fixture 2, and this boss 1C is screw fixed from the side by means of the boss fixing screw 4, so that the mirror part 1 is fixed at a predetermined position on the first fixture 2. In such a fixing method, the mirror part 1 receives a force in the Y-axis direction from the boss fixing screw 4, but does not receive a force in the Z-axis direction. Therefore, a possibility that a surface shape of the mirror 1B formed on the upper face (X-Y plane) of the base plate 1A is deformed due to an influence by forces at the time of the fixing is extremely low. Furthermore, since there is no influence by shrinkage stress of an adhesive as with conventional fixing methods using adhesive, the surface shape of the mirror 1B is stable. Therefore, it becomes possible to fix the mirror part 1 at a desired position with causing hardly any distortion on the surface of the mirror 1B.

Furthermore, the mirror part 1 is fixed so that the mirror part 1 excluding the boss 1C is not in contact with the receiving plate 2A of the first fixture 2, in other words, the mirror part 1 is fixed in a condition with a required gap G ensured between the lower face of the base plate 1A of the mirror part 1 and the upper face of the first fixture 2. The gap G is previously set to have a space such that thermal expansion of the mirror part 1 is not hindered. By providing the gap G, it becomes possible to considerably reduce a possibility that the shape of the surface of mirror 1B is deformed due to a temperature change.

Furthermore, at the time of screw fixing the boss 1C as mentioned above, it is preferable to install a boss plate 6 as a cushion member between the side face of the boss 1C and the tip portion of the boss fixing screw 4, as shown at the center of FIG. 3. By providing the boss plate 6 in this way, for example, even if there is a burr or the like at the tip portion of the boss fixing screw 4, biting of this burr into the boss 1C is avoided and hence the mirror part 1 can be more stably fixed to the first fixture 2.

Figure 11:
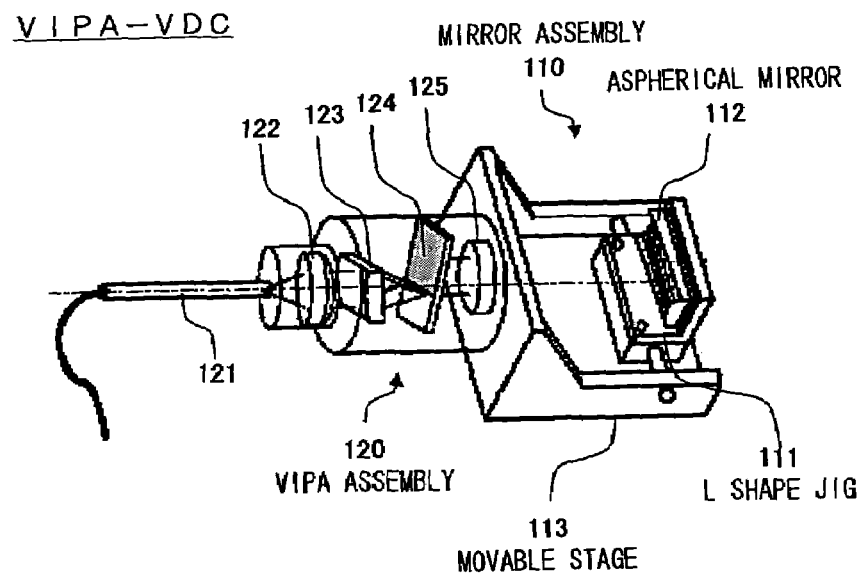
FIG. 11 is a perspective view showing the appearance of a known VIPA-VDC.
Figure 12:
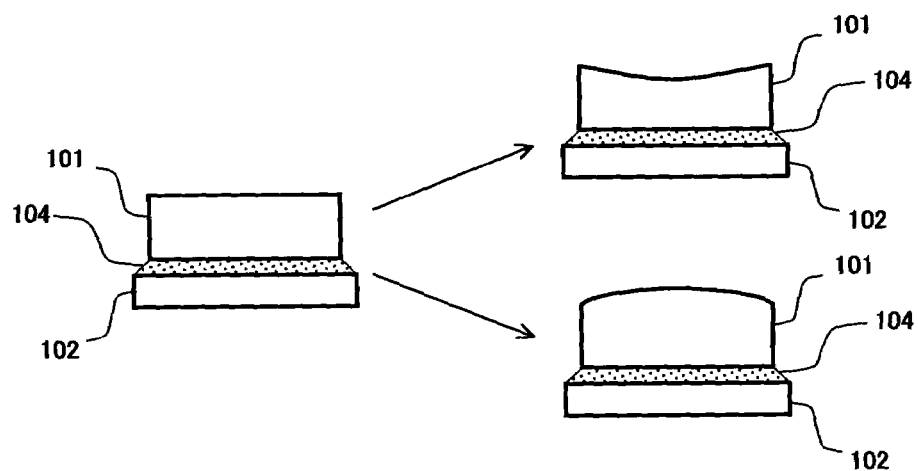
FIG. 12 is a diagram for explaining problems of a conventional mirror fixing method using an adhesive.
Figure 13:
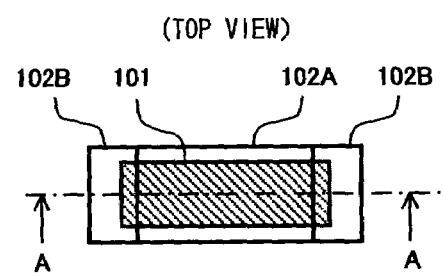
FIG. 13 is a diagram for explaining problems of a conventional mirror fixing method using mechanical fixing.
Figure 13:
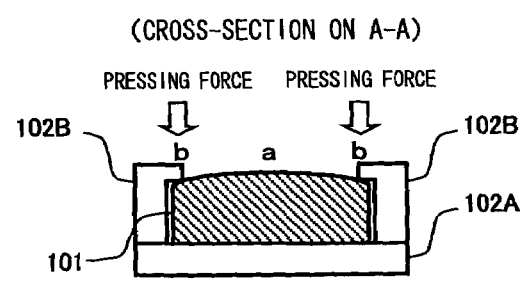

In this way, in this embodiment, the mirror 1B is stably fixed at the predetermined position on the first fixture 2, with hardly distortion to the surface of the mirror 1B. Furthermore, here the first fixture 2 on which the mirror part 1 is fixed is used for example as the optical system comprising the mirror assembly of the VIPA-VDC as shown in FIG. 11 described above. Therefore, the second fixture 3 is screw fixed to the first fixture 2 by means of the receiving plate fixing screws 5A and 5B, to be mounted at a required position on the movable stage.

Here is a description of a specific method of installing the structure in which the mirror part 1, first fixture 2 and second fixture 3 are assembled (hereunder called a mirror module) on the movable stage.

Figure 4:
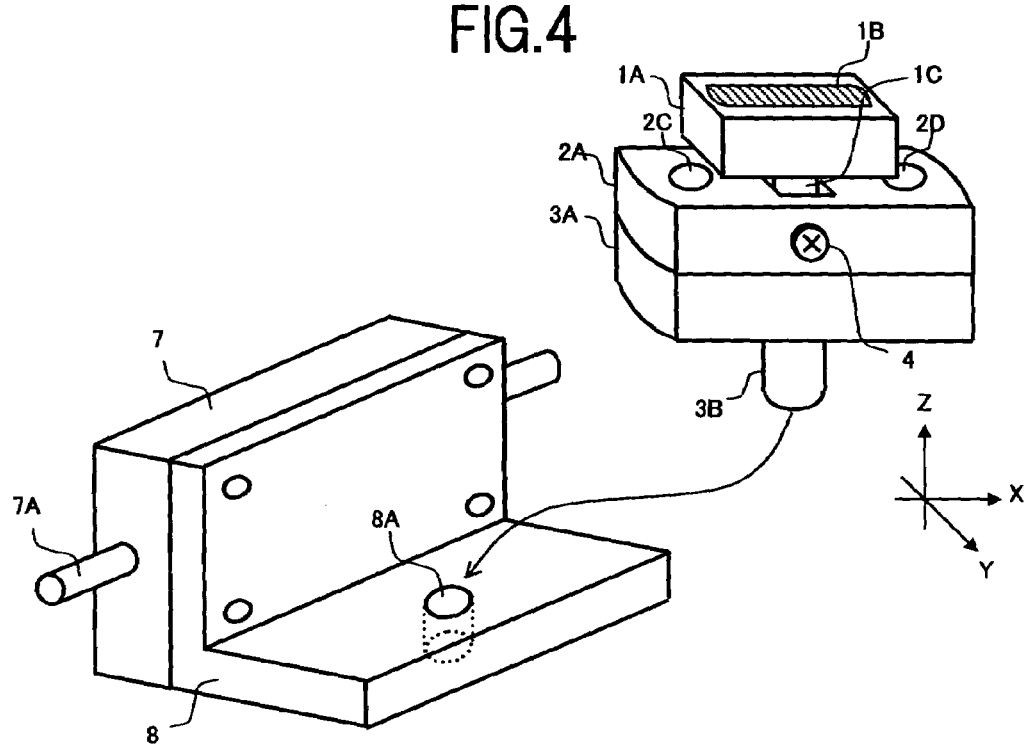
FIG. 4 is a diagram showing an example of a method of installing a mirror module on a movable stage in the embodiment.

FIG. 4 shows an enlarged movable stage used in the VIPA-VDC, illustrating a method of installing the mirror module on the movable stage.

In FIG. 4, an L shaped jig 8 is installed on a movable stage 7. A hole 8A is formed as an opening having a shape corresponding to the angle adjusting boss 3B of the second fixture 3, on the face perpendicular to the face on which the movable stage 7 is installed, in the L shaped jig 8. The mirror module is installed on the movable stage 7 by inserting the angle adjusting boss 3B in the hole 8A.

The movable stage 7 and the L shaped jig 8, shown in FIG. 4, correspond to the movable stage 113 and the L-shaped jig 111 shown in FIG. 11 described above.

Figure 5:
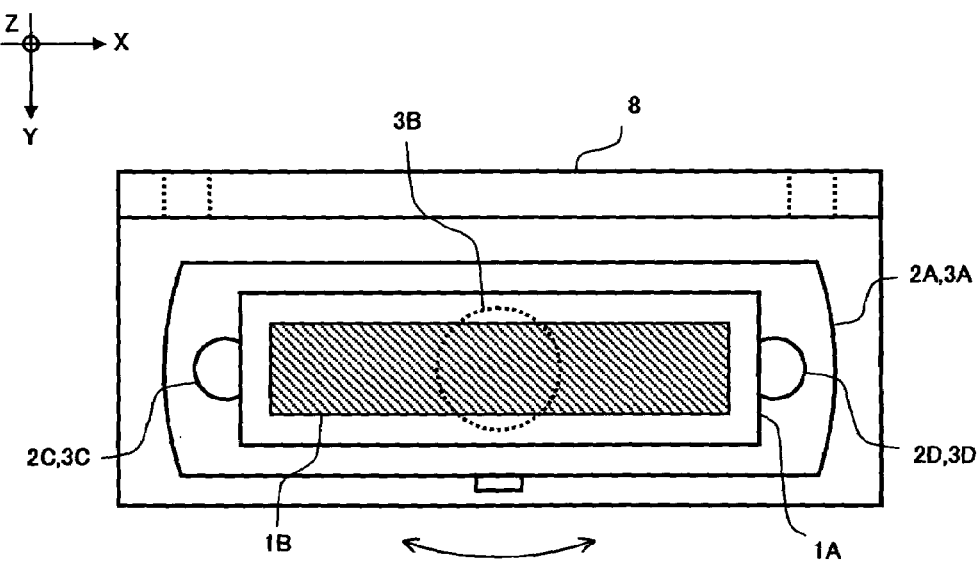
FIG. 5 is a plan view of the mirror module installed on the movable stage of FIG. 4, seen from above.

The mirror module installed on the movable stage 7, as shown in a plan view, seen from above in FIG. 5 (the Z-axis direction), becomes rotatable in the X-Y plane about the angle adjusting boss 3B. In this way, by making the mirror module rotatable in the X-Y plane, it becomes possible to easily perform adjustment for positioning the mirror 1B at an optimum angle relative to a travel shaft 7A (refer to FIG. 4) of the movable stage 7. That is to say, the mirror used in the optical system of the VIPA-VDC has an aspherical surface shape, as also shown in FIG. 11 described above, and the central axis being the design basis exists on the aspherical mirror. With the VIPA-VDC, in view of the characteristic thereof, it is necessary to position the central axis of the aspherical mirror and the travel shaft of the movable stage in parallel with each other. Therefore, by making the mirror module rotatable in the X-Y plane in the abovementioned manner, the central axis of the mirror 1B can be easily adjusted to be parallel with the travel shaft 7A of the movable stage 7.

Regarding the method of adjusting the central axis of the aspherical mirror in the VIPA-VDC, the present applicant has proposed a specific technique for adjusting the central axis of the aspherical surface and the travel shaft of the movable stage, based on reflected light obtained by irradiating a parallel light from the Z axis direction onto the aspherical mirror and the movable stage (refer to Japanese Patent Application No. 2002-000449). By applying the technique disclosed in this earlier patent application, it is possible to perform parallel adjustment of the mirror central axis in the present embodiment.

The mirror module in the present embodiment has a structure in which the center of the boss 1C of the mirror part 1, and the center of the angle adjusting boss 3B of the second fixture 3 are positioned on the central axis of the aspherical mirror. By adopting such a structure, an influence by any rotational deviation about the X-axis is minimized. Therefore, it becomes possible to more easily perform parallel adjustment of the mirror central axis relative to the running shaft 7A.

Figure 6:
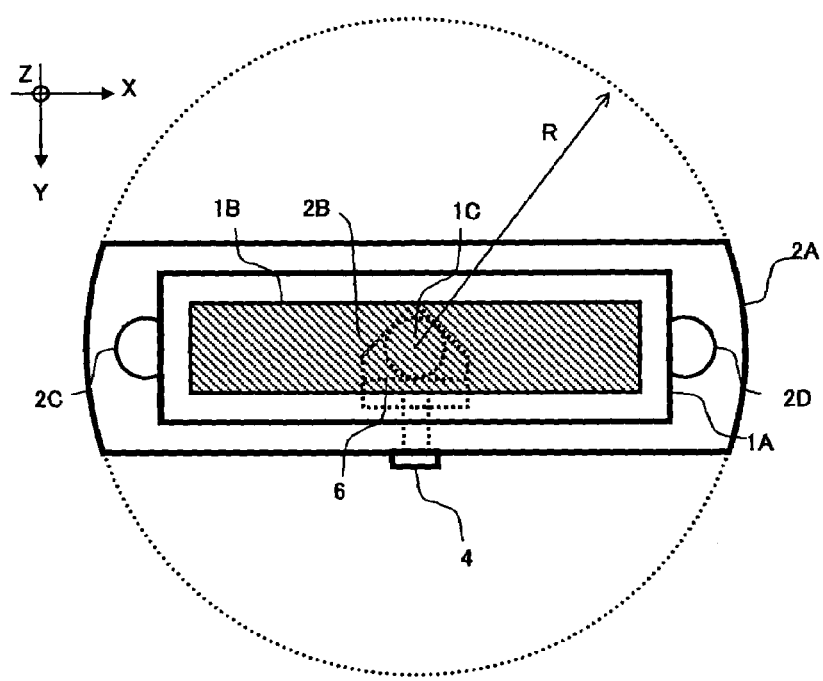
FIG. 6 is a plan view illustrating a preferable shape of a receiving plate of a second fixture in the embodiment.

When the abovementioned adjustment of the central axis of the mirror 1B is completed, the mirror module is fixed to the L shaped jig 8 by welding or the like. This fixing by welding can be performed, for example on the outer peripheral portion at the lengthwise opposite edges of the receiving plate 3A. In this case, as illustrated in a plan view, seen from above in FIG. 6 (the Z-axis direction), it is preferable that the lengthwise opposite edge portions of the receiving plate 3A (and the receiving plate 2A) are of a shape so as to be positioned on the circumference of radius R centered on the boss 1C. By having this shape, the position of the outer peripheral portion of the receiving plate 3A is not deviated from being on the circumference of radius R, even if the mirror module is rotationally adjusted in the X-Y plane. Therefore, the welding position of the receiving plate 3A and the L shaped jig 8 can be set on the same circumference. As a result, it is possible to efficiently perform the operation of fixing by welding the mirror module to the L shaped jig 8.

The mirror module fixed by welding to the L shaped jig 8 in the above manner is fixed in a movable state at a desired position along the travel shaft 7A of the movable stage 7, and as a result, the abovementioned mirror assembly 110 of the VIPA-VDC as shown in FIG. 11 is constructed. Then, by installing this mirror assembly 110 on the VIPA assembly 120 as with the conventional case, a VIPA-VDC is constructed, in which a compensation amount for wavelength dispersion is changed in accordance with the position of the mirror module. The compensation operation for wavelength dispersion in the VIPA-VDC constructed in this manner is the same as for the conventional case, and hence description thereof is omitted here.

According to the VIPA-VDC to which the mirror fixing method of the present invention is applied as in the above manner, a possibility that the surface shape of the mirror is deformed due to temperature change or the like is extremely low. Therefore, wavelength dispersion compensation can be performed stably with high accuracy.

In the abovementioned embodiment, the description has been made for the example where the mirror fixing method of the present invention is applied to the mirror assembly of the known VIPA-VDC. However the applicable scope of the present invention is not limited to this one example, and the present invention can be widely applied to well known optical systems using mirrors.

Figure 7:
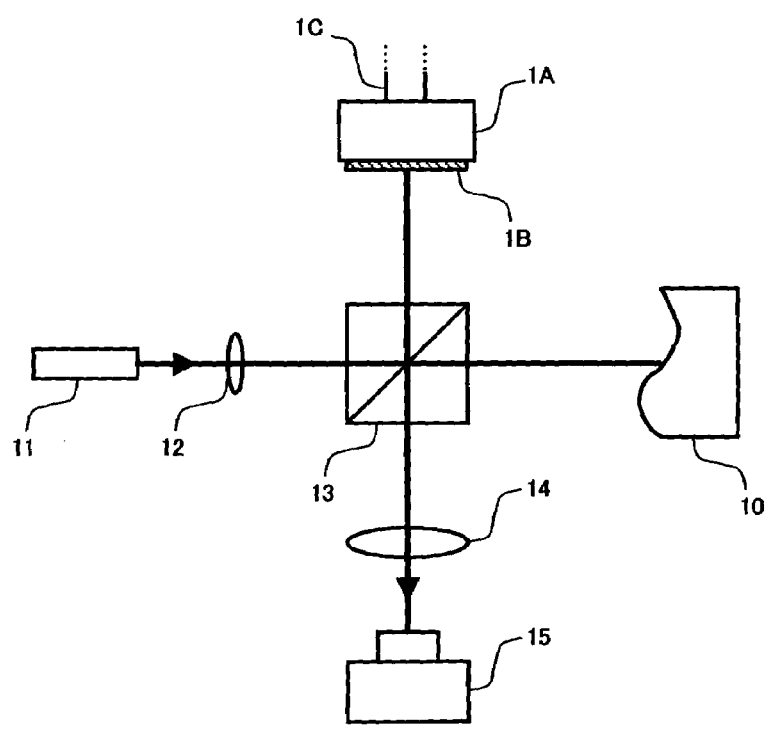
FIG. 7 is a block diagram showing an example of when the present invention is applied to an interference optical system for a surface shape measuring device, in conjunction with the embodiment.
Figure 8:
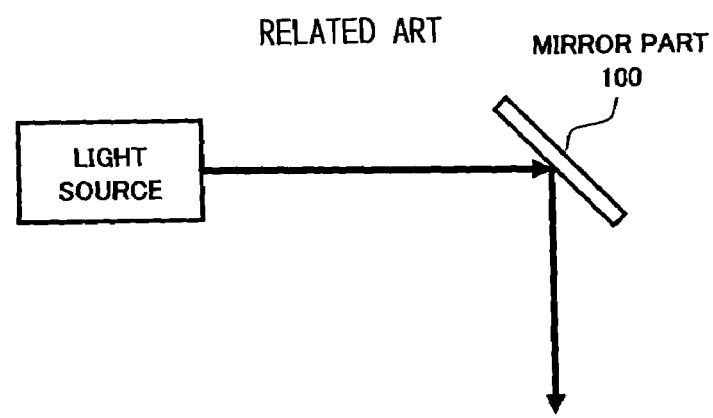
FIG. 8 shows an example of an optical system constructed using a typical mirror.
Figure 9:
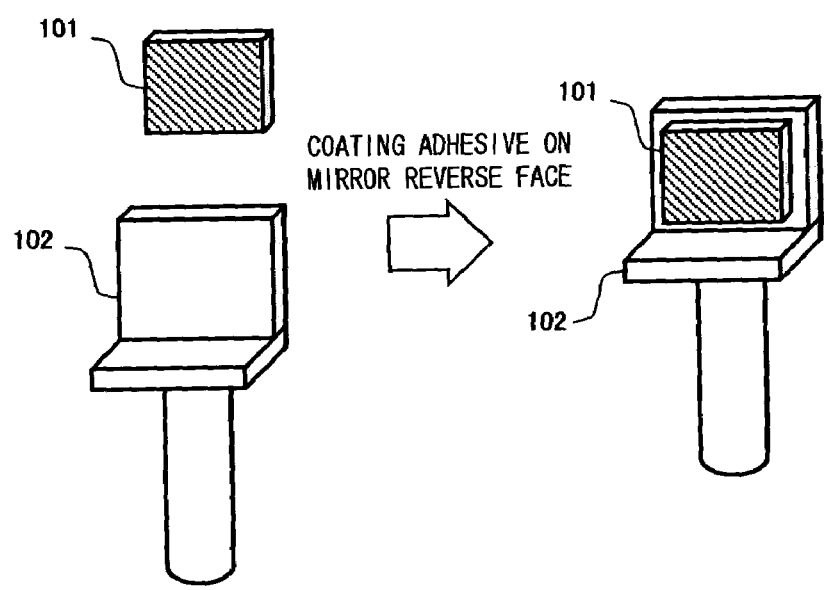
FIG. 9 is a diagram for explaining a conventional mirror fixing method using an adhesive.
Figure 10:
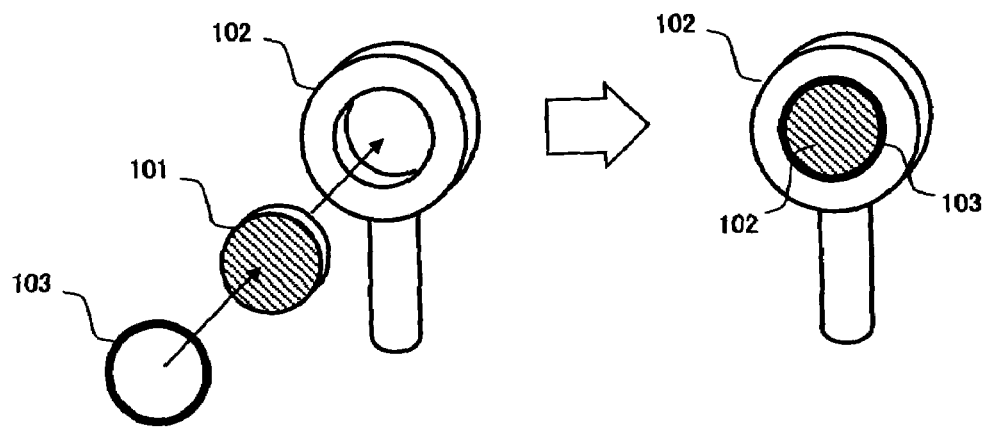
FIG. 10 is a diagram for explaining a conventional mirror fixing method using mechanical fixing.

For example, it is also effective to apply the present invention to a mirror part constituting an interference optical system for a surface shape measuring device as shown in FIG. 7. More specifically, in the interference optical system of FIG. 7, in order to measure the surface shape of a detection object 10, a light emitted from an input optical path 11 passes through a lens 12 and is branched into two by a beam splitter 13, and then, branched lights are respectively irradiated onto the detection object 10 and the mirror 1B that is fixed by applying the present invention. Then, the light reflected from the target 10 and the light reflected from the mirror 1B pass through the beam splitter 13 to be combined, and then sent to a CCD camera 15 via a lens 14. Interference fringes which are caused by interference of the reflected lights, are detected by the CCD camera 15, and the surface shape of the detection object 10 is measured from the distribution of the fringes. In this case, since the mirror 1B becomes the standard for measurement, it is preferable that the surface shape thereof is as flat as possible without waviness or the like. The mirror 1B of the optical apparatus according to the present invention is practically unaffected by thermal expansion due to temperature change as mentioned above. Therefore, the surface shape of the mirror 1B can be kept flat, enabling prevention of deterioration in measurement accuracy.

What is claimed is:

1. A mirror fixing method capable of reducing stress distortion of a surface of a mirror which constitutes part of a variable wavelength dispersion compensator, said stress distortion being generated as a result of fixing said mirror, said method comprising:

forming a base plate having the mirror on one face thereof;

providing a boss on another face of the base plate opposite to the face on which the mirror is formed;

forming a first fixture including a receiving plate with an opening capable of inserting said boss therein;

providing the receiving plate with a screw hole perpendicular to a side wall of said opening;

fixing the boss, which is inserted in the opening of said receiving plate, with a screw from the side using the screw hole, so that the mirror and the base plate are not in contact with other members; and forming an aspherical mirror as said mirror in said variable wavelength dispersion compensator, on the one face of the base plate.

2. A mirror fixing method according to claim 1, wherein said boss is a cylindrical shape, further comprising:

forming a V-groove structure in a side wall portion of said opening opposite to the screw hole of said receiving plate, wherein a side face of said boss is made to abut on said V-groove, to fix said boss in said V-groove with said screw.

3. A mirror fixing method according to claim 1, further comprising:

installing a cushion member to be fixed between said boss and a tip portion of said screw.

4. A mirror fixing method according to claim 1, further comprising:

coupling said first fixture with a second fixture to constitute a mirror module, the second fixture being mountable on a movable stage, and installing said mirror module on said movable stage via said second fixture.

5. A mirror fixing method according to claim 4, wherein said second fixture includes a receiving plate formed with an angle adjusting boss, further comprising:

providing on said movable stage a member formed with an opening capable of inserting therein said angle adjusting boss of said receiving plate and installing said mirror module on said movable stage by inserting said angle adjusting boss of said receiving plate in said opening of said member.

6. A mirror fixing method according to claim 5, wherein said installing comprises:

installing said mirror module on said movable stage so as to be rotatable about said angle adjusting boss, performing rotation adjustment of a position of said mirror module relative to a travel shaft of said movable stage, and securing said receiving plate of said second fixture to said movable stage.

7. A mirror fixing method according to claim 6, further comprising forming an outer peripheral portion of said receiving plate of said second fixture in a shape so as to be positioned on the circumference centered on said angle adjusting boss, and when performing rotation adjustment of said mirror module, positioning said outer peripheral portion of said receiving plate on the same circumference.

8. A mirror fixing method according to claim 1, further comprising when a boss is provided on the other face of the base plate, arranging the center of the boss on the central axis of the aspherical mirror.

9. A variable wavelength dispersion compensator including an aspherical mirror generating differing wavelength dispersions to reflected lights corresponding to a shape of a reflecting surface of the aspherical mirror, comprising:

a mirror part including a base plate formed with said aspherical mirror on one face thereof, and a boss provided on the other face of said base plate opposite to the face on which the mirror is formed; and a first fixture fixing said boss, so that said mirror part excluding said boss is not in contact with other members.

10. A variable wavelength dispersion compensator according to claim 9, wherein a first fixture includes a receiving plate which is formed with an opening capable of inserting said boss therein and provided with a screw hole perpendicular to a side wall of said opening, and said boss which is inserted in the opening of said receiving plate, is fixed with a screw from the side using said screw hole.

11. A variable wavelength dispersion compensator according to claim 10, wherein, in said mirror part, said boss is a cylindrical shape, and a side wall portion of said opening opposite to the screw hole of said receiving plate is made a V-groove structure, and a side face of said boss is made to abut on said V-groove, to fix said boss in said V-groove with said screw.

12. A variable wavelength dispersion compensator according to claim 11, further comprising:

a cushion member installed between said boss and a tip portion of said screw.

13. A variable wavelength dispersion compensator according to claim 9, further comprising;

a movable stage and a second fixture mountable on said movable stage, wherein said second fixture and said first fixture are coupled with each other to constitute a mirror module, and said mirror module is installed on said movable stage via said second fixture.

14. A variable wavelength dispersion compensator according to claim 13, wherein said second fixture includes a receiving plate formed with an angle adjusting boss, said movable stage is provided with a member formed with an opening capable of inserting therein said angle adjusting boss of said receiving plate, and said mirror module is installed on said movable stage by inserting said angle adjusting boss of said receiving plate in said opening of said member.

15. A variable wavelength dispersion compensator according to claim 14, wherein said mirror module is installed on said movable stage so as to be rotatable about said angle adjusting boss, and after rotation adjustment of a position of said mirror module relative to a travel shaft of said movable stage, said receiving plate of said second fixture is secured to said movable stage.

16. A variable wavelength dispersion compensator according to claim 15, wherein in said second fixture, said receiving plate includes an outer peripheral portion positioned on the circumference centered on said angle adjusting boss, and when performing rotation adjustment of said mirror module, said outer peripheral portion of said receiving plate is positioned on the same circumference.

17. A variable wavelength dispersion compensator according to claim 9, wherein the center of the boss is arranged on the central axis of said aspherical mirror.

* * * * *